United States Patent [19]

Ogata et al.

[11] 4,093,482
[45] June 6, 1978

[54] HEAT AND SOUND INSULATOR OF CURVED CORRUGATED PAPERBOARD AND METHOD OF SHAPING SAME

[75] Inventors: Mitsutoshi Ogata; Norinao Naito, both of Fukuoka, Japan

[73] Assignees: Nissan Motor Company Limited; Fukuoka Paper Company, Limited, both of Japan

[21] Appl. No.: 686,314

[22] Filed: May 14, 1976

[30] Foreign Application Priority Data

May 15, 1975 Japan .................................. 50-58137

[51] Int. Cl.² .......................... B32B 3/28; B32B 1/00
[52] U.S. Cl. ..................................... 156/210; 156/196; 181/284; 181/290; 264/285; 264/299; 428/174; 428/182; 428/186
[58] Field of Search ............... 428/182, 186, 174, 178, 428/119; 156/196, 210, 212, 207, 245; 264/285, 287, 299; 181/33 R, 33 G, 284, 290

[56] References Cited

U.S. PATENT DOCUMENTS

| | | | |
|---|---|---|---|
| 563,775 | 7/1896 | Lantzke | 428/178 |
| 3,518,142 | 6/1970 | Dooley | 428/182 |
| 3,530,021 | 9/1970 | Reichl | 156/210 |
| 3,673,034 | 6/1972 | Squier | 156/245 |
| 3,723,222 | 3/1973 | Kurita et al. | 156/210 |
| 3,920,496 | 11/1975 | Wilkinson et al. | 428/182 |

Primary Examiner—George F. Lesmes
Assistant Examiner—P. Thibodeau
Attorney, Agent, or Firm—Lowe, King, Price & Markva

[57] ABSTRACT

A plane plate of corrugated paperboard, which is produced by bonding a corrugated medium and at least one liner board with a thermoplastic resin, is shaped into a curved plate by means of a hot-press so that the resin fluidifies and allows the medium and each liner board to make individual and slipping movements during press-forming. The resin hardens upon subsequent temperature reduction and affords the curved heat and sound insulator plate a good shape retentivity.

6 Claims, 7 Drawing Figures

HEAT AND SOUND INSULATOR OF CURVED CORRUGATED PAPERBOARD AND METHOD OF SHAPING SAME

This invention relates to a heat and sound insulating plate member of corrugated paperboard which is at least partly curved to mate with a curved surface of a wall member subject to insulation lining and a method of shaping the same. This heat and sound insulating member is particularly suitable for use in the interior of either a building or a vehicle.

Insulation of heat and sound is almost indispensable to rooms of buildings, cabins of ships and passenger compartments of cars for rendering such living spaces really comfortable. Both in buildings and vehicles, it is one of the prevailing methods for heat and sound insulation to cover or line the surfaces of walls and/or ceilings with a heat and sound insulating material. Of course this method is applicable to the interior of the rooms, cabins and passenger compartments. (These living spaces will hereinafter be represented by a living room). The insulating material is used usually in the form of sheet or plate of a relatively large thickness and can easily be attached to the walls (including the ceiling) of a living room when the walls have plane surfaces. The situation is different, however, when a wall has a curved surface as is frequently seen in modern living rooms.

To firmly attach an insulating plate onto a curved surface of a wall, the insulating plate must preliminarily be warped or shaped, for example, by means of a press to have a curved surface which mates with and can be brought into intimate contact with the curved wall surface. Accordingly a good formability is required of the material of the insulating plate in additon to usual requirements for a low or moderate specific gravity and inexpensiveness. Besides, the insulating material must have a sufficiently high rigidity so that a desirably curved plate may not easily or spontaneously be deformed before and after the application to the curved wall surface but may long retain its shape. It is desired that the shape be retained even when the curved insulating plate experiences changes in the ambient temperature and humidity.

Corrugated paperboard, which is quite familiar as a packaging material, is considered a good insulating material for the above described use if certain measures are taken to make up for its rather inferior formability into a curved shape and retentivity of the shape.

It is an object of the present invention to provide a heat and sound insulating plate member fundamentally of corrugated paperboard which is at least partly shaped to have a desirably curved surface to mate with a curved surface of a wall member subject to insulation lining and can retain the curved exact shape indefinitely.

It is another object of the invention to provide a method of shaping a heat and sound insulating plate member of fundamentally corrugated paperboard at least partly having a curved surface.

According to the invention, a heat and sound insulating plate member of corrugated paperboard comprises: a corrugated paper medium, a sheet of liner of paper arranged to cover one side of the corrugated medium, and a layer of a thermoplastic resin formed between the corrugated medium and the liner such that the corrugated medium is joined at respective top regions of its parallel ridges with the inside surface of the liner with the resin layer sandwiched therebetween. The plate member is at least partly shaped such that the liner has a curved surface, and the resin layer is hardened after the shaping of the curved surface.

The insulating plate member may have another sheet of liner adhered to the other side of the corrugated medium with a layer of the theremoplastic resin.

A method according to the invention of shaping the above described heat and sound insulating plate comprises the following steps:

(a) preparing a plane composite plate by forming a thin layer of a thermoplastic resin between a sheet of corrugated paper medium and a sheet of paper liner arranged to cover one side of the corrugated medium such that the layer adheres to the corrugated medium at respective top regions of its parallel ridges and to the inside surface of the plane liner, (b) press-forming the plane composite plate into a desired shape at a temperature above the softening point of the thermoplastic resin, and (c) lowering the temperature to harden the resin layer in the shaped plate member.

Other features and advantages of the invention will become apparent from the following detailed description of preferred embodiments with reference to the accompanying drawings, wherein.

Figure 3:
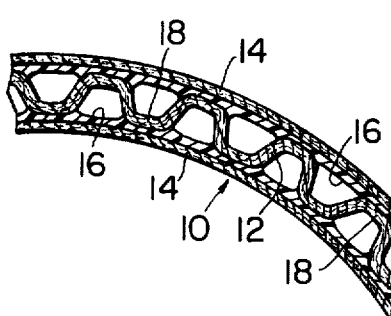
FIG. 3 is a sectional view of a curved insulation plate according to the invention.

Referring to FIG. 3, a heat and sound insulating member 10 according to the invention takes the form of a curved plate. The insulation plate 10 is illustrated as entirely curved but may alternatively be curved only partly or locally. There is no restriction on the shape of the curved portion of the insulation plate 10.

Figure 5:
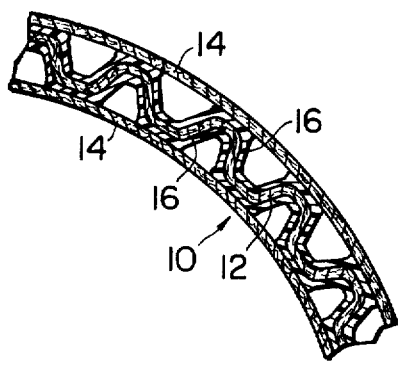
FIGS. 5 and 6 are sectional views of two differently constructed insulation plates, respectively, as different embodiments of the invention.
Figure 6:
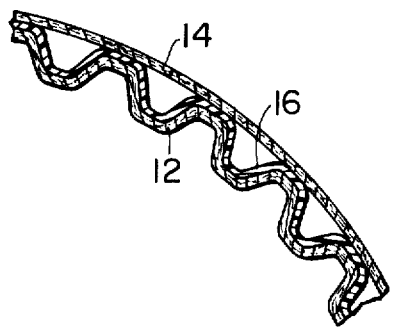

The insulation plate 10 (which will hereinafter be referred to as the insulator) is fundamentally made of corrugated paperboard which is constituted of a corrugated paper core or medium 12 and two flat paper plates (liner boards) 14 respectively bonded to both sides of the corrugated medium 12, so that the corrugated medium 12 is sandwiched between the liner boards 14. It is permissible, however, to omit one of the two liners 14 as shown in FIG. 6. In the case of FIG. 6, the material of the insulator 10 may be regarded as a single-wall corrugated paperboard. As a requisite to the insulator 10 according to the invention, each of the two liners 14 is bonded to the corrugated medium 12 with a thin layer 16 of a thermoplastic resin. As in ordinary corrugated paperboard, the bond between the corrugated medium 12 and each liner 14 is established only at top regions 18 of the respective parallel ridges in the corrugated medium 12. Accordingly the thermoplastic resin layer 16 may initially be formed either on the inside surface of each liner 14 as shown in FIG. 3 or on the surfaces of the corrugated medium 12 as shown in FIG. 5.

The corrugated medium 12 may be of any conventional material utilized in corrugated paperboards for usual uses such as in packaging. The material of the liners 14 also is selected from various paperboards which are of use as the liner boards of usual corrugated paperboards. The corrugated medium 12 and the liners 14 may be made of kraft papers, waterproof papers or water-repelling papers. The two liners 14 may be different in material and/or thickness.

The thermoplastic resin for forming the layers 16 is required only to serve as an adhesive for paper and have a softening point above room temperature but below a temperature at which the above described materials of the corrugated medium 12 and the liners 14 are damaged. Accordingly, a large variety of thermoplastic resins are useful as the material of this layer 16. Preferred examples of useful resins are polyethylene, polypropylene, polyvinyl chloride, polyvinyl acetate, polystyrene, ethylene-propylene copolymers and ethylene-vinyl acetate copolymers. A filler exemplified by talc may be added to the thermoplastic resin.

Figure 1:
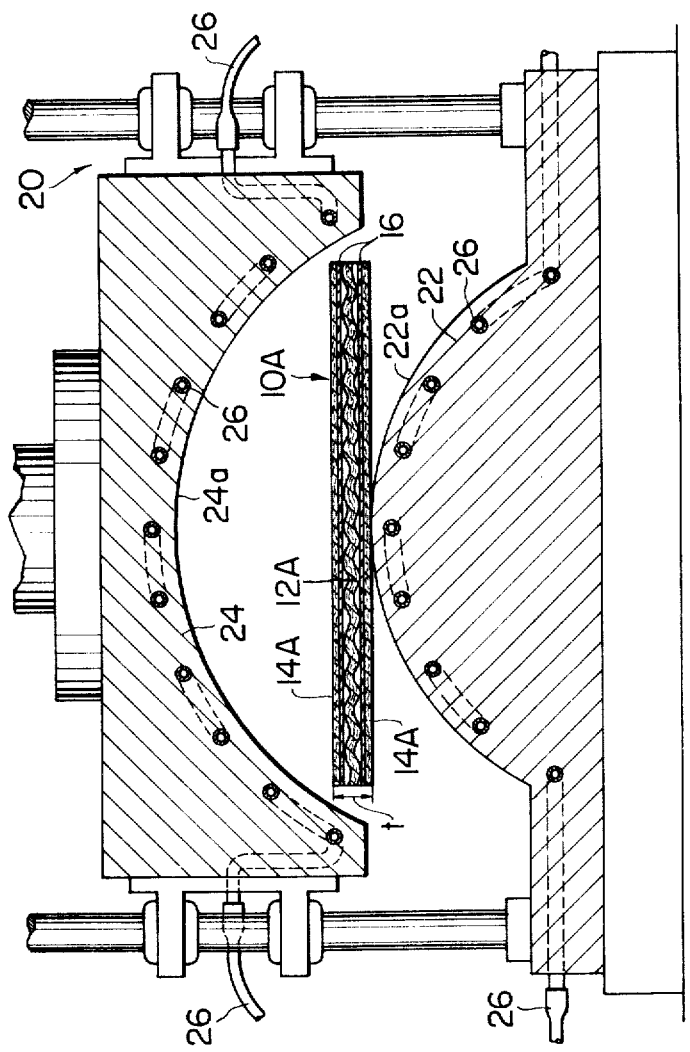
FIG. 1 is a fragmentary elevation in section of a hot-press for shaping a plane plate of corrugated paperboard into a curved plate.

The insulator 10 has a curved shape, but is initially produced as a plane plate or board 10A as illustrated in FIG. 1. A thermoplastic resin for forming the bonding layers 16 is applied onto either the inside surfaces of plane liners 14A or the surfaces of a corrugated but plane core 12A. Then the liners 14A are placed on both sides of the core 12A followed by application of heat to accomplish adhesion of the resin layers 16 to the core 12A (or the liners 14A) which initially had no coating of the thermoplastic resin.

Figure 2:
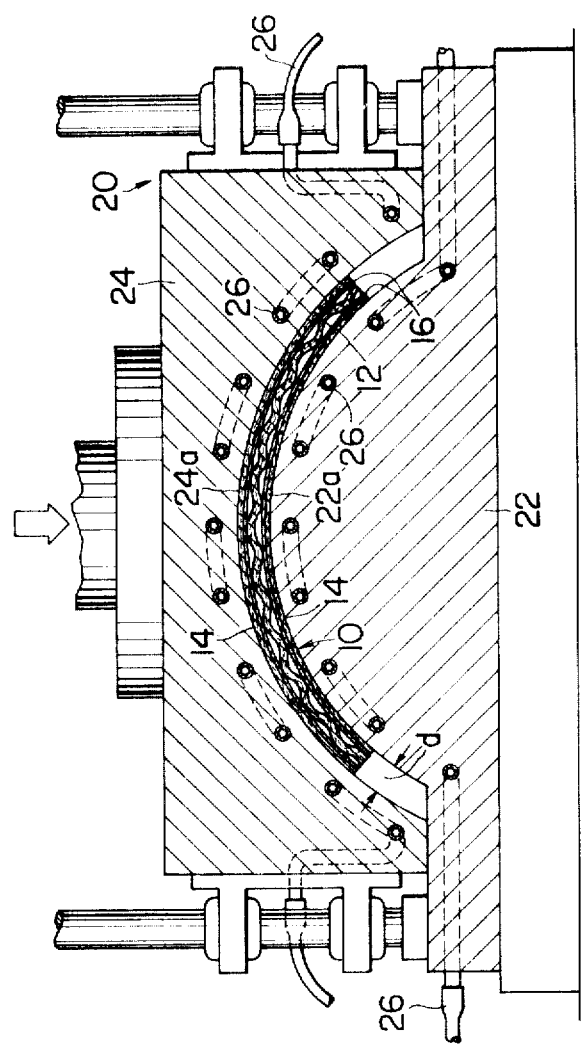
FIG. 2 shows the same in a position at the end of the shaping operation.

The thus produced plane board or composite plate 10A is shaped into the curved plate 10 by means of a hot-press 20 as illustrated in FIGS. 1 and 2. The press 20 has a male die 22 and a female die 24 which have curved surfaces 22a and 24a, respectively, in accordance with the intended shape of the curved insulator 10. The dies 22 and 24 are provided with certain heating means such as spiral or meandering pipes 26 for passing steam or a heated oil therethrough. Such heating pipes 26 may of course be replaced by electric heating elements.

When the dies 22 and 24 are heated to a temperature above the softening point of the thermoplastic resin forming the layers 16, the plane board 10A of corrugated paperboard is placed on the male die 22, for example, and the female die 24 is pressed against the plane board 10A until the distance $d$ (FIG. 2) between the die surfaces 22a and 24a becomes slightly shorter than the thickness $t$ of the plane board 10A. The dies 22 and 24 are kept at the aforementioned temperature during this shaping operation. The female die 24 is lowered rather slowly so that heat may transfer from the dies 22 and 24 to the resin layers 16.

Since the resin layers 16 are heated and fluidify during the above described shaping operation, the corrugated medium 12A and the individual liners 14A are allowed to make slipping movements or relative displacements to certain extents while the plane board 10A is gradually compressed and warped. Accordingly, the corrugated medium 12A and the two liners 14A are allowed to be individually and differently stretched or shrunk (laterally) during the pressing. This phenomenon is an important advantage of the invention. Owing to such slipping and individual movements of the corrugated medium 12A and the liners 14A, the shaped insulator 10 is free from irregular strains in the interior and does not deform spontaneously.

When the pressing is completed, the shaped insulator 10 is allowed to stand for a while at a reduced temperature to cause the resin layers 16 to again harden. The bond between the corrugated medium 12 and each liner 14 is strengthened in the thus formed curved insulator 10 than in the original plane board 10A since the bond is established over a widened area as the result of flattening of the top region 18 of each ridge in the corrugated medium 12 in a compressed state. The curved insulator 10 can long retain its shape and resist against deformation by various stresses such as external forces and changes in the ambient temperature and humidity fundamentally by reason that the bond between the corrugated medium 12 and each liner 14 is established after the completion of the press-forming which accompanies an enlargement of the bonding area.

In forming the curved insulator 10 of the double-wall type as shown in FIGS. 2 and 3, it is permissible to leave one, or even both, of the two liner boards 14A unjoined with the corrugated medium 12A at the start of the press-forming. For example, the upper liner board 14A in FIG. 1 may be prepared as a separate member having a hardened thermoplastic resin coating 16 on the lower surface thereof. This liner board 14A is simply placed on the exposed side of the corrugated medium 12A which has been joined with the lower liner board 14A to constitute a single-wall corrugated paperboard with the sandwiched resin layer 16.

Figure 4:
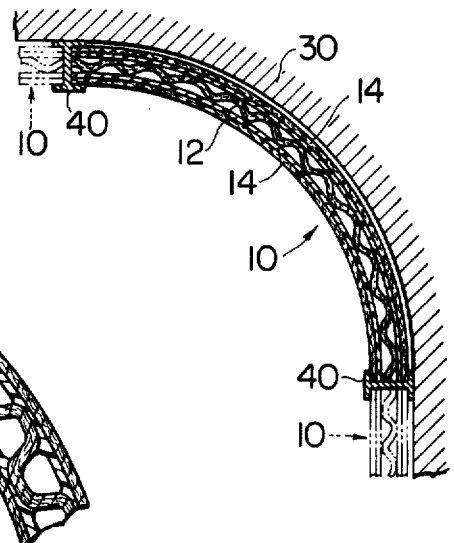
FIG. 4 is a sectional view showing the insulation plate of FIG. 3 in a state attached onto a curved wall member.

The die surfaces 22a and 24a are shaped in conformance with the shape of a curved wall member indicated at 30 in FIGS. 3 and 4 which is intended to be covered with the curved insulator 10. Accordingly the insulator 10 can easily be brought into intimate contact with and attached to the wall 30. Joining of the insulator 10 with the wall 30 may be accomplished by means of either an adhesive (not shown) or suitable fasteners or retainers as indicated at 40.

Figure 7:
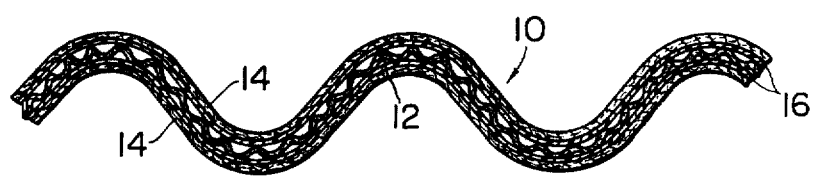
FIG. 7 is a sectional view of an insulation plate which has the same construction as the insulation plate of FIG. 3 but is shaped differently.

FIG. 7 shows an example of a differently shaped insulator 10 according to the invention. In this embodiment the insulator 10 is corrugated as a whole.

Any decorative pattern or figure may be printed on the outside surface of one of the liners 14 which is to be exposed to the interior of a living room when the insulator 10 is attached to the wall 30. Alternatively, the same surface of the liner 14 may be lined with a sheet of decorative paper of artificial leather. When the insulator 10 is constructed in the form of a single-wall corrugated paperboard as in FIG. 6, a decorative sheet material may be applied onto the exposed side of the corrugated medium 12 after the curved plate 10 is press-formed. Other than decorative printing or coating, the surface of the liner 14 intended to be left exposed may be subjected to a chemical treatment for rendering it either waterproof or fireproof.

What is claimed is:

1. A method of shaping a heat and sound insulating plate member of corrugated paperboard to form a plate member having at least one permanently curved portion, the method comprising the steps of:

preparing a plane composite plate by joining a sheet of plane liner paper to a corrugated medium of paper by a thermoplastic resin such that a layer of said resin in hardened state adheres both to said corrugated medium at respective top regions of parallel ridges thereof and to the inside surface of said plane liner;

press-forming said plane composite plate into a desired shape having at least one permanently curved portion with application of heat to said layer from the outside of said liner and said corrugated medium such that the temperature of said layer is maintained above the softening point of said resin and that said resin fluidifies and permits said liner and said corrugated medium to compensate for relative displacement during the forming; and lowering the temperature to harden said layer in the shaped plate member whereby the shaped plate member is free from such internal strains as cause spontaneous deformation of the plate member.

2. A method as claimed in claim 1 wherein the firstly stated step includes an additional step of joining another sheet of plane liner of paper to said corrugated medium by said thermoplastic resin such that another layer of said resin in hardened state adheres both to said corrugated medium at respective top regions of parallel ridges thereof and to the inside surface of said another plane liner.

3. A method as claimed in claim 1 further comprising the step of adhering an at least partly curved liner to said shaped plate member to cover the exposed side of said corrugated medium.

4. A method as claimed in claim 1 wherein said layer is formed by initially coating one side of said plane liner with said thermoplastic resin and then making the coated resin adhere to said corrugated medium.

5. A method as claimed in claim 1 wherein said layer is formed by initially coating said one side of said corrugated medium with said thermoplastic resin and then causing the coated resin to adhere to said inside surface of said plane liner.

6. A method as claimed in claim 1 wherein said thermoplastic resin is selected from the group consisting of polyethylene, polypropylene, polyvinyl chloride, polyvinyl acetate, polystyrene, ethylene-propylene copolymers and ethylene-vinyl actate copolymers.

* * * * *